(12) United States Patent
Antanies

(10) Patent No.: US 7,957,932 B1
(45) Date of Patent: Jun. 7, 2011

(54) DATA ANALYSIS SYSTEMS AND RELATED METHODS

(76) Inventor: John Antanies, Phoenix, AZ (US)

( * ) Notice: Subject to any disclaimer, the term of this patent is extended or adjusted under 35 U.S.C. 154(b) by 176 days.

(21) Appl. No.: 12/141,285

(22) Filed: Jun. 18, 2008

Related U.S. Application Data

(63) Continuation-in-part of application No. 11/691,871, filed on Mar. 27, 2007, now Pat. No. 7,555,405, which is a continuation-in-part of application No. 10/954,082, filed on Sep. 30, 2004, now Pat. No. 7,283,928.

(51) Int. Cl.
*G06F 17/18* (2006.01)

(52) U.S. Cl. ......................................................... 702/179

(58) Field of Classification Search .................. 702/179, 702/180, 182, 183
See application file for complete search history.

(56) References Cited

U.S. PATENT DOCUMENTS

| | | | |
|---|---|---|---|
| 5,546,516 A | 8/1996 | Austel et al. | |
| 5,694,524 A | 12/1997 | Evans | |
| 5,850,339 A | 12/1998 | Giles | |
| 6,098,063 A | 8/2000 | Xie et al. | |
| 6,110,109 A | 8/2000 | Hu et al. | |
| 6,507,832 B1 | 1/2003 | Evans et al. | |
| 6,539,392 B1 | 3/2003 | Rebane | |
| 6,687,558 B2 | 2/2004 | Tuszynski | |
| 7,286,959 B2 * | 10/2007 | Steinke | 702/182 |
| 2001/0041995 A1 | 11/2001 | Eder | |
| 2002/0091609 A1 | 7/2002 | Markowski | |
| 2002/0103688 A1 | 8/2002 | Schneider | |
| 2002/0152148 A1 | 10/2002 | Ebert | |
| 2003/0004903 A1 | 1/2003 | Kehder et al. | |
| 2003/0050048 A1 | 3/2003 | Abed et al. | |
| 2003/0050814 A1 | 3/2003 | Stoneking et al. | |
| 2004/0064353 A1 | 4/2004 | Kim et al. | |
| 2004/0122860 A1 | 6/2004 | Srinivasan | |
| 2005/0192963 A1 * | 9/2005 | Tschiegg et al. | 707/9 |

* cited by examiner

*Primary Examiner* — Mohamed Charioui
(74) *Attorney, Agent, or Firm* — Booth Udall, PLC

(57) ABSTRACT

Data analysis systems and related methods. An implementation of a first method of generating one or more bar plots for evaluating the performance of a process may include generating a plurality of breakpoints using historical data values from a process and generating one or more bar plots for an independent or a dependent variable and distributing the plurality of breakpoints along the one or more bar plots. The method may also include retrieving one or more current data values from the process, plotting at least one indicator at a position along the one or more bar plots using the one or more current data values, and indicating the desirability of the position of the at least one indicator relative to the plurality of breakpoints.

13 Claims, 16 Drawing Sheets

\* = Indicator
\# = Bar Plot

DATA ANALYSIS SYSTEMS AND RELATED METHODS

CROSS REFERENCE TO RELATED APPLICATIONS

This application is a continuation-in-part application of the earlier U.S. Utility patent application to John Antanies entitled "Computerized Method for Creating a Cusum Chart for Data Analysis," application Ser. No. 11/691,871, filed Mar. 27, 2007, now pending, which is a continuation-in-part application of the earlier U.S. Utility patent application to John Antanies entitled "Computerized Method and Software for Data Analysis," application Ser. No. 10/954,082, filed Sep. 30, 2004, now U.S. Pat. No. 7,283,928, issued Oct. 16, 2007, the disclosures of which are hereby incorporated entirely herein by reference.

BACKGROUND

1. Technical Field

Aspects of this document relate generally to computer analysis systems and methods used for analyzing data from an industrial, manufacturing, or business processes.

2. Background Art

Data analysis systems are conventionally utilized in combination with many industrial and commercial processes to collect and process information coming from the process. Data analysis systems conventionally receive sensor data, equipment performance information, product property information, and other information about the process that may be useful if stored. Determining what data and which variables measured in the process affect process output are common uses for conventional data analysis systems.

SUMMARY

Implementations of data analysis systems may utilize methods of data analysis including implementations of a first method of generating one or more bar plots for evaluating the performance of a process. Implementations of the method may include generating a plurality of breakpoints using historical data values from a process and generating one or more bar plots for an independent or a dependent variable and distributing the plurality of breakpoints along the one or more bar plots. The method may also include retrieving one or more current data values from the process, plotting at least one indicator at a position along the one or more bar plots using the one or more current data values, and indicating the desirability of the position of the at least one indicator relative to the plurality of breakpoints.

Implementations of a first method of generating one or more bar plots may include one, all, or any of the following:

Using the one or more current data values may further include calculating an average or coefficient of variation using the one or more current data values.

The plurality of breakpoints may be quartiles.

Indicating the desirability of the position of the at least one indicator relative to the plurality of breakpoints may further include changing one of a color, a size, an icon, an animation, or a shape of the at least one indicator.

The one or more bar plots may further include a long dimension and generating the one or more bar plots may further include orienting the long dimension vertically or horizontally.

The historical data values and the current data values may be included in computer readable form on computer readable media in one or more database including in a computer system coupled with the process.

Generating one or more bar plots may further include generating one or more bar plots corresponding with one or more dependent variables on a first screen and generating one or more bar plots corresponding with one or more independent variables on one or more additional screens. The method may further include accessing the one or more bar plots included on one or more additional screens by selecting one or more of the one or more bar plots on the first screen or by selecting one or more indicators on the first screen configured to access the one or more bar plots including on the one or more additional screens.

Implementations of data analysis systems may utilize a second implementation of a method of generating one or more bar plots for evaluating the performance of a process. The method may include receiving a plurality of historical data values and arranging the plurality of historical data values into a plurality of sample sets. The plurality of sample sets may include values of an independent variable or a dependent variable. The method may also include arranging the plurality of sample sets according to the values of the independent variable or the dependent variable and calculating a plurality of breakpoints using the values of the independent variable or the dependent variable. The method may further include receiving one or more current data values including values of the independent variable or the dependent variable and generating one or more bar plots having a long dimension by plotting at least one indicator and the plurality of breakpoints at a plurality of positions corresponding with values of the independent or the dependent variable along the long dimension of the one or more bar plots. The position of the at least one indicator may be calculated using the one or more current data values. The method may further include indicating the desirability of the position of the at least one indicator relative to the positions of the plurality of breakpoints by changing one of a color, a size, an icon, an animation, or a shape of the at least one indicator.

Implementations of a second method of generating one or more bar plots may include one, all, or any of the following:

The plurality of breakpoints are quartiles.

Generating one or more bar plots may further include generating one or more bar plots corresponding with one or more dependent variables on a first screen and generating one or more bar plots corresponding with one or more independent variables on one or more additional screens. The method may also include accessing the one or more bar plots including on one or more additional screens by selecting one or more of the one or more bar plots on the first screen or by selecting one or more indicators on the first screen configured to access the one or more bar plots included on the one or more additional screens.

The historical data values and the current data values may be included in computer readable form on computer readable media in one or more databases included in a computer system coupled with the process.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1A:
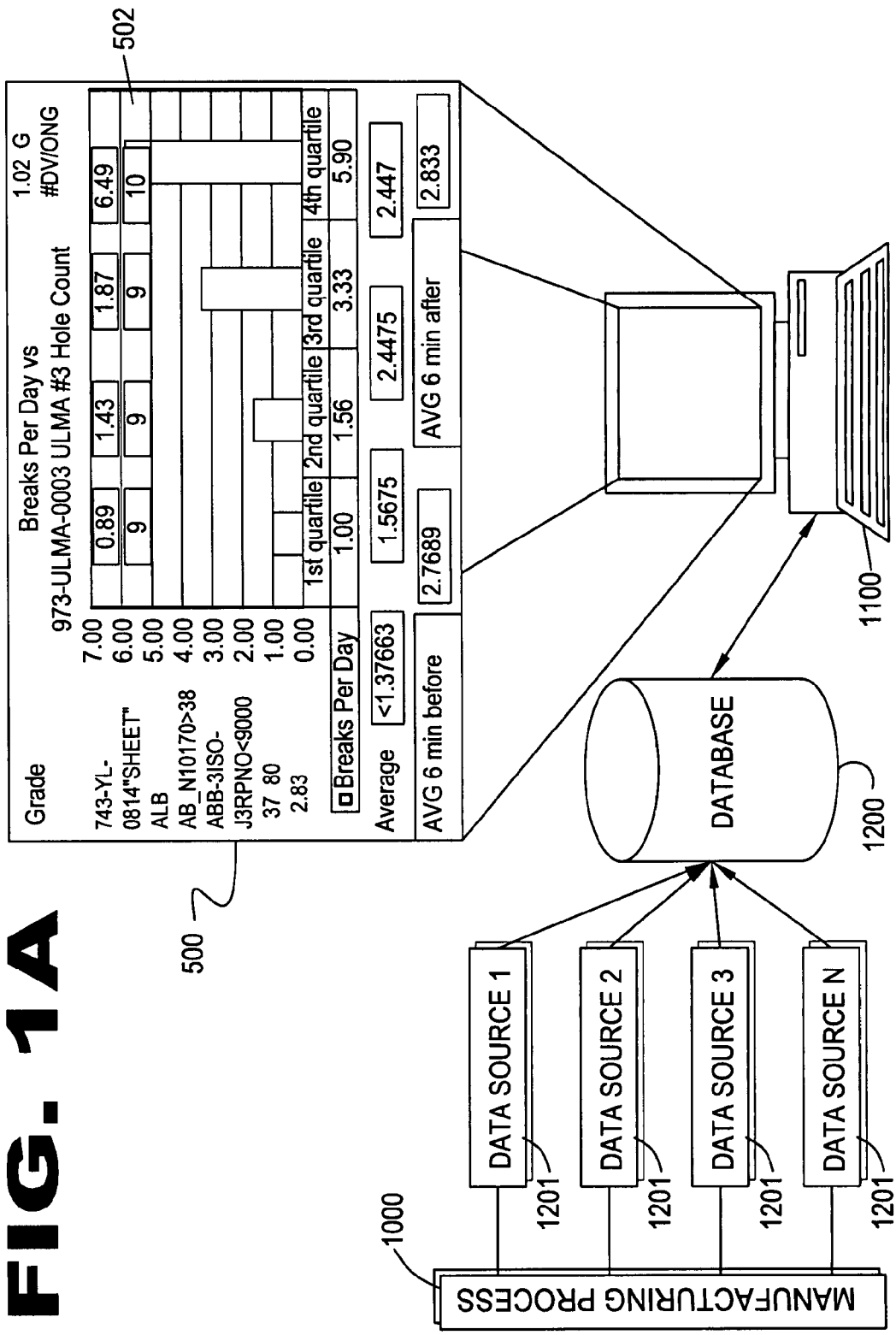
FIG. 1A is a block diagram of an implementation of computer system employing a computer program to perform a computerized method for data analysis.

Implementations of computerized method and software for data analysis provide a computerized method for identifying a causal relationship between at least one independent variable and a dependent variable in a set of data representing historical operating parameters of an industrial process, and software for carrying out the method. Referring to FIG. 1A, the computerized method and software for data analysis is executed on a computer 1100, such as a typical personal computer or the like. The computer 1100 accesses data from a database 1200, including data obtained from at least one data source 1201 in communication with an industrial or manufacturing process 1000. Various methods of automating manufacturing equipment, and recording historical data derived from a manufacturing process 1000, are well known to those skilled in the art. Database 1200 thus contains a set of data representing historical operating parameters of an industrial process. Note that the database 1200 may be maintained within the computer 1100, or may be a separately maintained database, such as a database server accessed on a computer network.

The computerized method for data analysis involves inputting selected data from the database 1200 into the computer 1100. The selected data is organized into sample sets, such as all data samples collected in a single day. The selected data includes, within each sample set, at least one independent variable and one dependent variable, wherein the dependent variable is typically chosen to represent a fault condition, or a quality measure, production rate, speed, etc., within the manufacturing process 1000.

The sample sets are arranged, according to an independent variable, into distribution sets. In the illustrated implementation, the distribution sets are quartile sets, although the present invention is not limited to quartile distribution sets. The distribution sets are used to generate a graph displayed on the computer 1100 that relates independent variable data to the dependent variable, illustrating a correlation between the independent and dependent variables to aid in determining a cause and effect relationship.

Figure 1B:
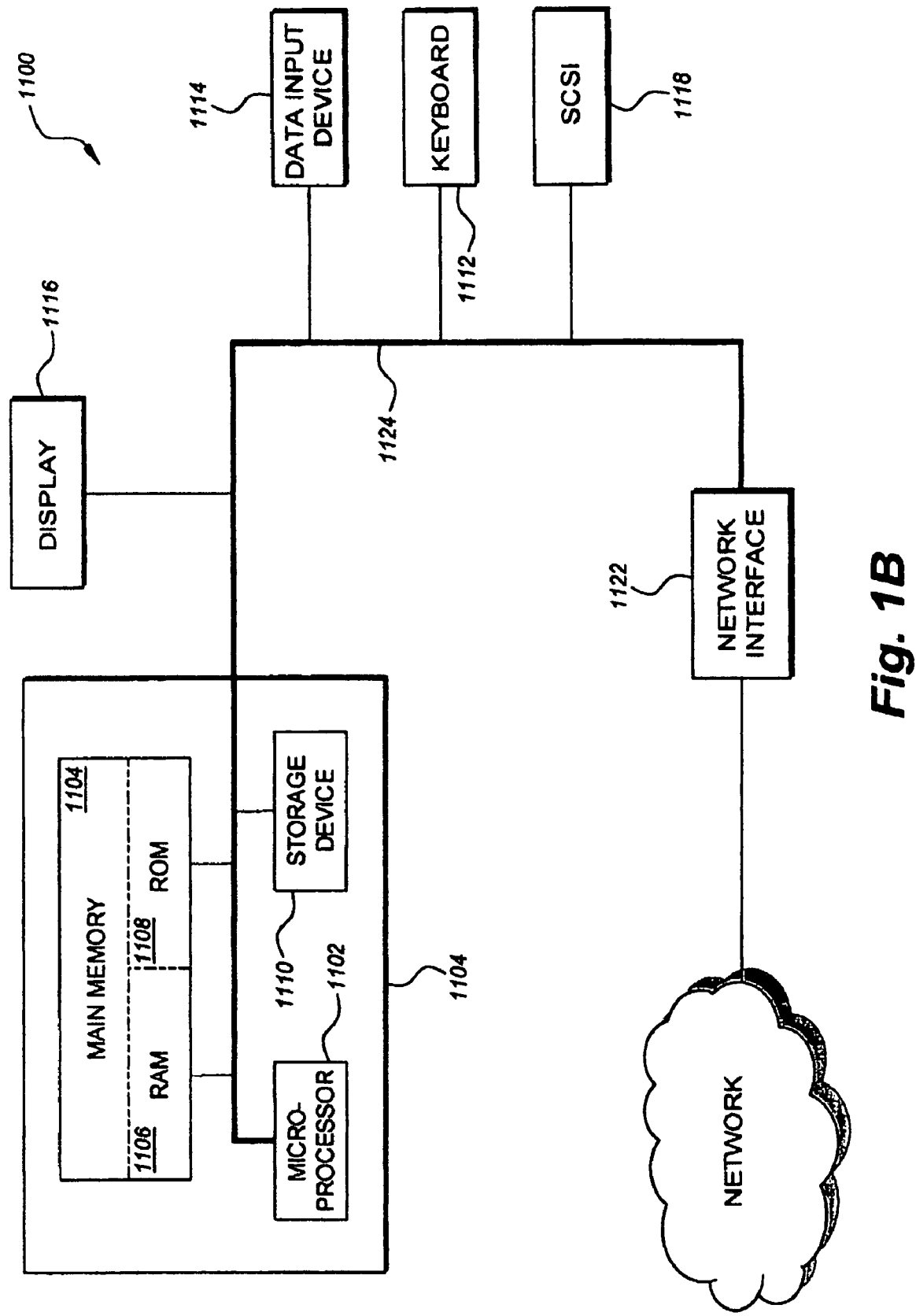
FIG. 1B is a block diagram of a computer system in which software for data analysis operates according to the computerized method for data analysis.

The computerized method and software for data analysis comprises a computerized method for data analysis implemented by software executing on a computer 1100. Referring to FIG. 1B, the computer 1100 is a general purpose or personal computer of a generally known and common configuration. Such a computer has a microprocessor 1102 connected by a bus 1124 to an area of main memory 1104, comprising both read only memory (ROM) 1108, and random access memory (RAM) 1106, and a storage device 1110 having means for reading a coded set of program instructions on a computer readable medium which may be loaded into main memory 1104 and executed by the microprocessor 1102. The computer 1100 has a display device 1116, a keyboard 1112, and may include other input devices 1114 such as automating devices in communication with the manufacturing process 1000, a mouse, joystick, etc. A network communication interface 1122 is provided for serial communications on a network or other serial communications link. Additionally, the computer 1100 may include a Small Computer System Interface (SCSI) adapter 1118 for communication with peripheral devices, including data sources 1201 such as automating devices in communication with the manufacturing process 1000.

Figure 2A:
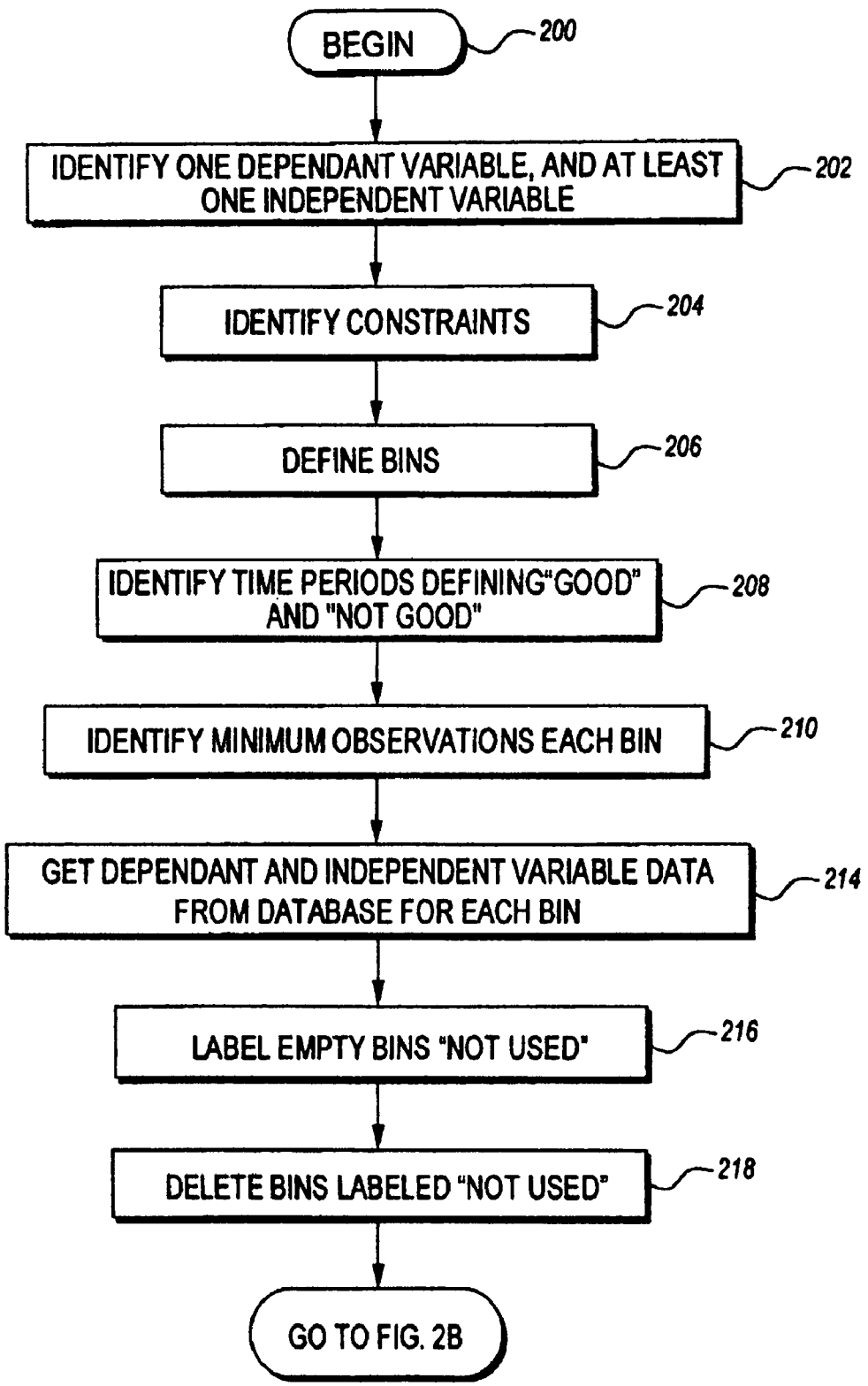
FIGS. 2A and 2B are a flow charts that illustrated implementations of a computerized method for data analysis.
Figure 2B:
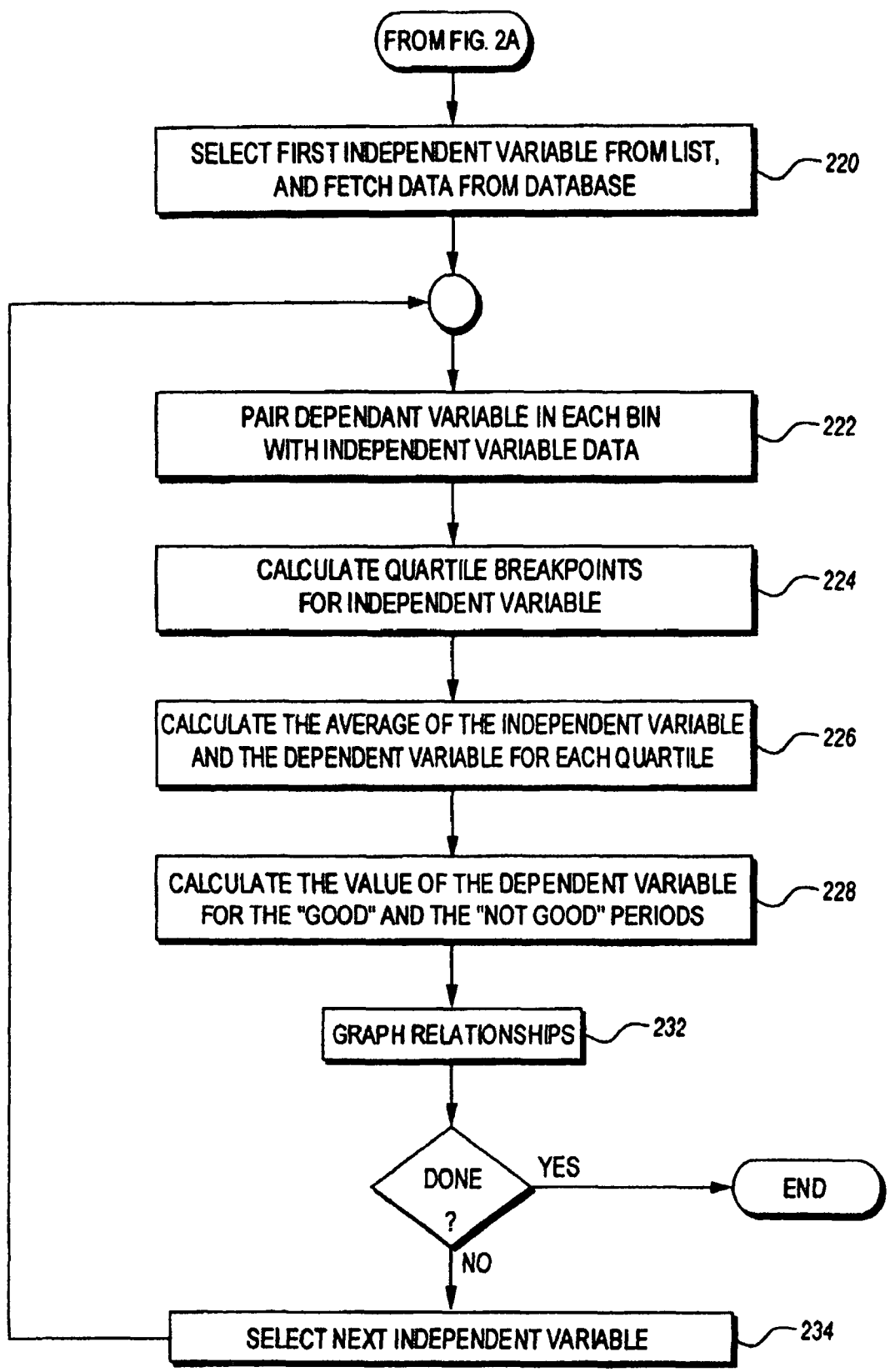
Figure 3A:
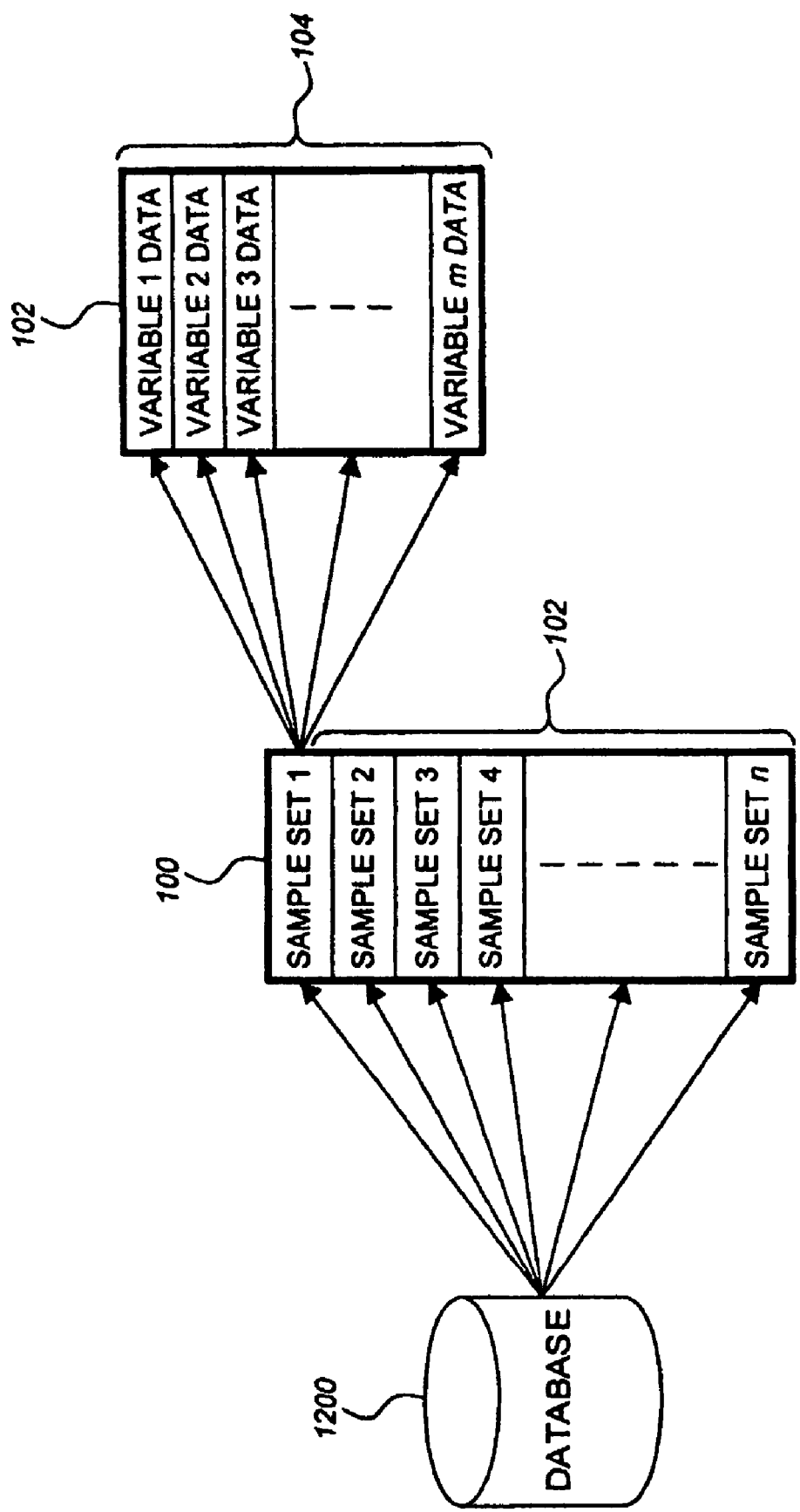
FIGS. 3A, 3B and 3C are block diagrams depicting a data transformation from raw historical data to filtered data organized into bins for analysis.
Figure 3B:
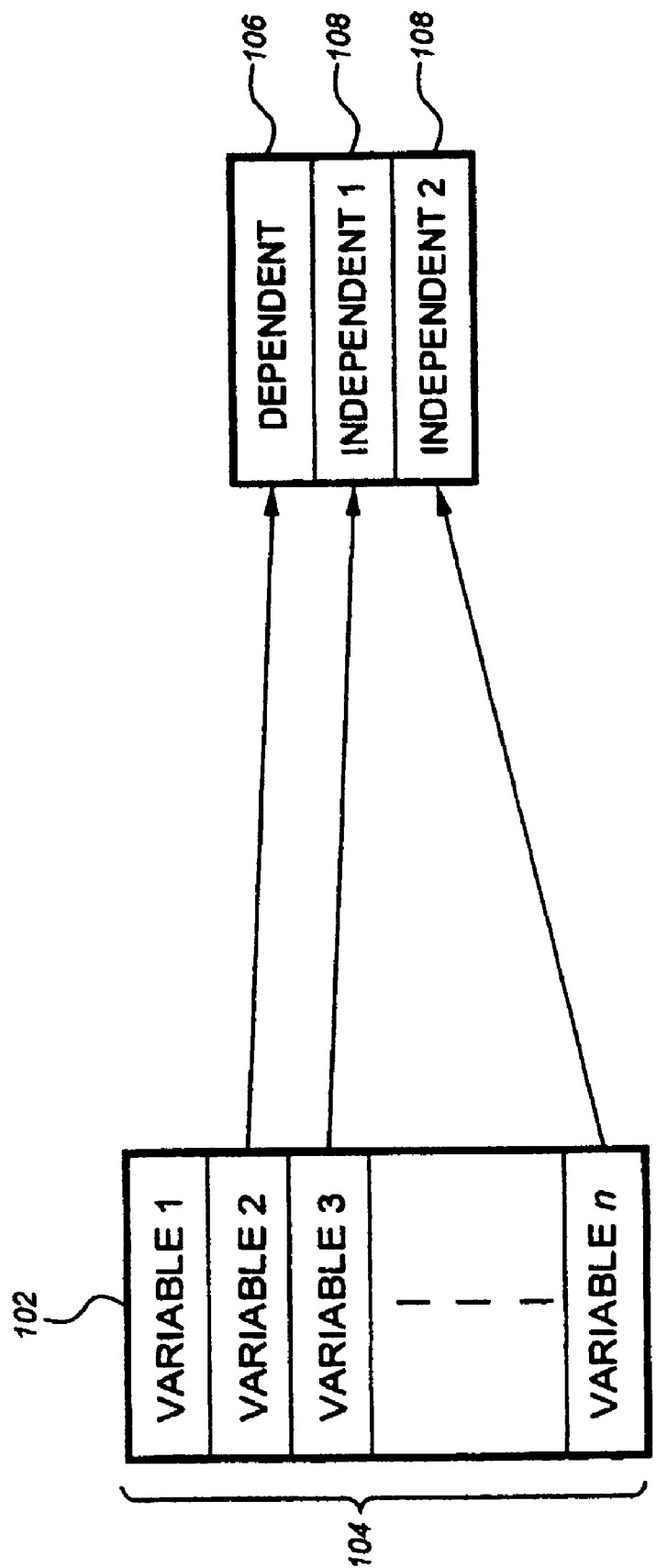
Figure 3C:
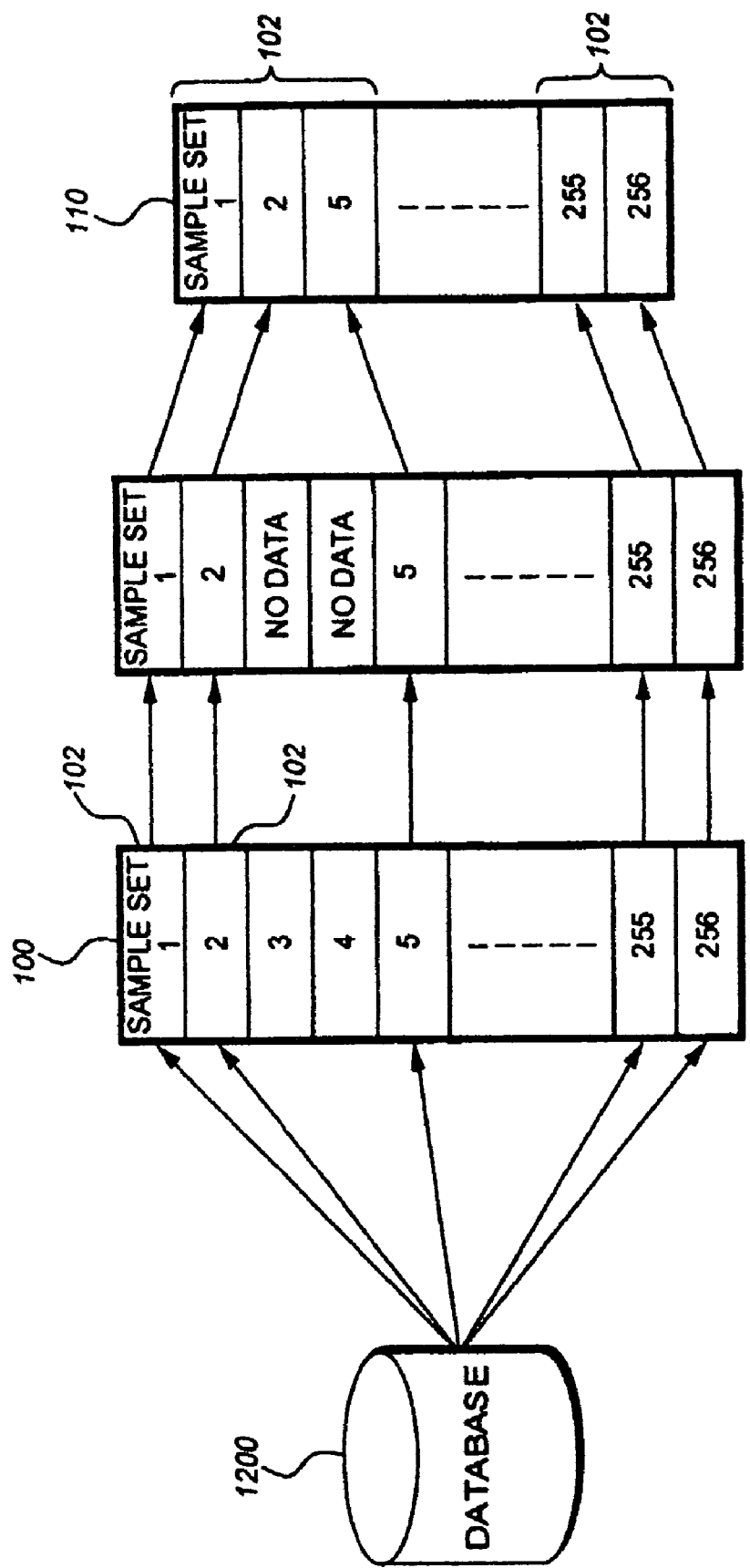

Turning now to FIGS. 2A and 2B, a flowchart illustrates the computerized method for data analysis is described in greater detail. Referring particularly to FIG. 2A along with FIGS. 3A, 3B, and 3C, the process begins, at step 200, with a series of steps wherein a user enters information relating generally to identifying the data to be analyzed, and the data is retrieved accordingly from the database 1200. The database 1200 contains data samples for a number of variables spanning a statistically useful historical time period. For the purposes of analysis, the data samples are organized into a raw collection 100 of sample sets or "bins" 102, each bin 102 being a uniform portion of the historical time period, such as a day or an hour. Within each bin 102 are data samples for several of the data variables 104. One of the data variables is designated as the dependent variable 106 (step 202), the dependent variable generally being a variable related to a particular fault condition, or a quality measure, production rate, speed, etc., within the manufacturing process 1000. At least one of the variables is designated as an independent variable 108. Constraints are identified for the dependent variable 106 and the independent variable 108, such as minimum or maximum values, or a range of data considered useful or desirable for a particular analysis (step 204).

Bins 102 are defined by setting the size and number of the bins desired for analysis. For example, each bin 102 might be defined to contain a day's worth of data samples, and two hundred and fifty six (256) bins 102 might be used (step 206). Also, a minimum number of samples may be specified for the bins 102. In addition to the bins 102, a time period may be identified to define a period of "good" process performance versus a period of "bad" process performance (step 208).

Once the bins 102 have been defined, data for the dependent variable 102 and the independent variable(s) are retrieved from the database for each of the bins 102 (step 214), according to the constraints that were defined by the user. Note that the dependent variable 106 might be represented within a bin 102 as a single data value (such as the count of an event occurring within the time frame of a bin 102), or as a number of data samples (such as a periodic sampling of a parameter within the time frame of a bin 102). If the dependent variable 106 is represented as a number of data samples, the average value for the number of data samples within a bin 102 is determined, along with a coefficient of variation, and recorded as the dependent variable value. As a result of the data constraints applied to the data retrieved from the database 1200, some of the bins 102 may have no data. Bins 102 with no data, or bins 102 that contain less than a specified minimum number of samples, are marked (step 216) and deleted (step 218). As an alternative, in addition to deleting the bins 102 that have been marked, new bins 102 may be identified within the database 1200 to replace the deleted bins, maintaining the desired number of bins 102. The result is a cleaned collection 110 of bins 102 that contain valid and relevant data for the dependent variable 106 and the independent variables 108.

Figure 4:
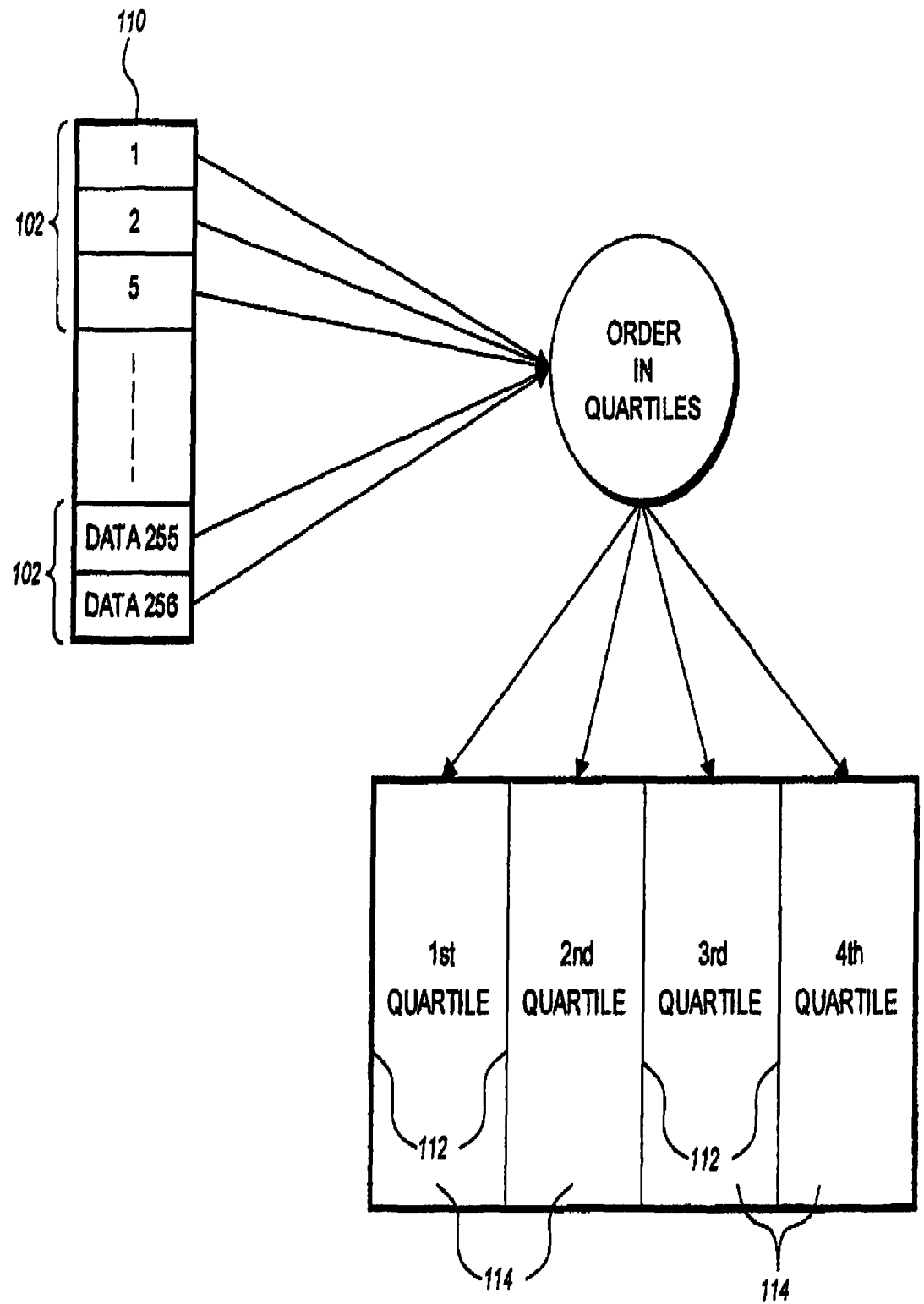
FIG. 4 is a block diagram depicting a data transformation from historical data organized in bins into a quartile distribution of the data.

Turning now to FIG. 2B, along with FIG. 4, the bins 102 are ranked according to an independent variable 108, and separated into a plurality of distribution sets 114, and a graph is produced to visually relate the dependent variable data to the independent variable data. The bins 102 may be ranked by the average value of the independent variable 108 within each bin, or by the coefficient of variation of the independent variable 108 data within the bins, or both. In the implementation illustrated, the distribution sets 114 consist of four (4) quartile sets. This is repeated for each independent variable 108.

At step 220, a first independent variable is selected from a list of the independent variables identified previously at step 202. The bins 102 are then ordered into an ascending (or descending) series according to the independent variable data (step 222), using the average value or the coefficient of variation for each bin 102. The independent variable data is then used to calculate breakpoints 112 that divide the series of bins 102 into a plurality of distribution sets 114 (step 224). The distribution sets 114 may be determined to contain approximately the same number of bins 102, or may be determined by another criteria, such as a weighted distribution of the independent variable data. For each of the distribution sets 114, the average value of the independent variable 108 and the average value of the dependent variable 106 are determined (step 226). Additionally, a coefficient of variation may be determined for the independent variable 108 and for the dependent variable 106.

In addition to the distribution sets 114, data values or averages may be determined for the "good" and "not good" periods defined previously (step 228).

Figure 5:
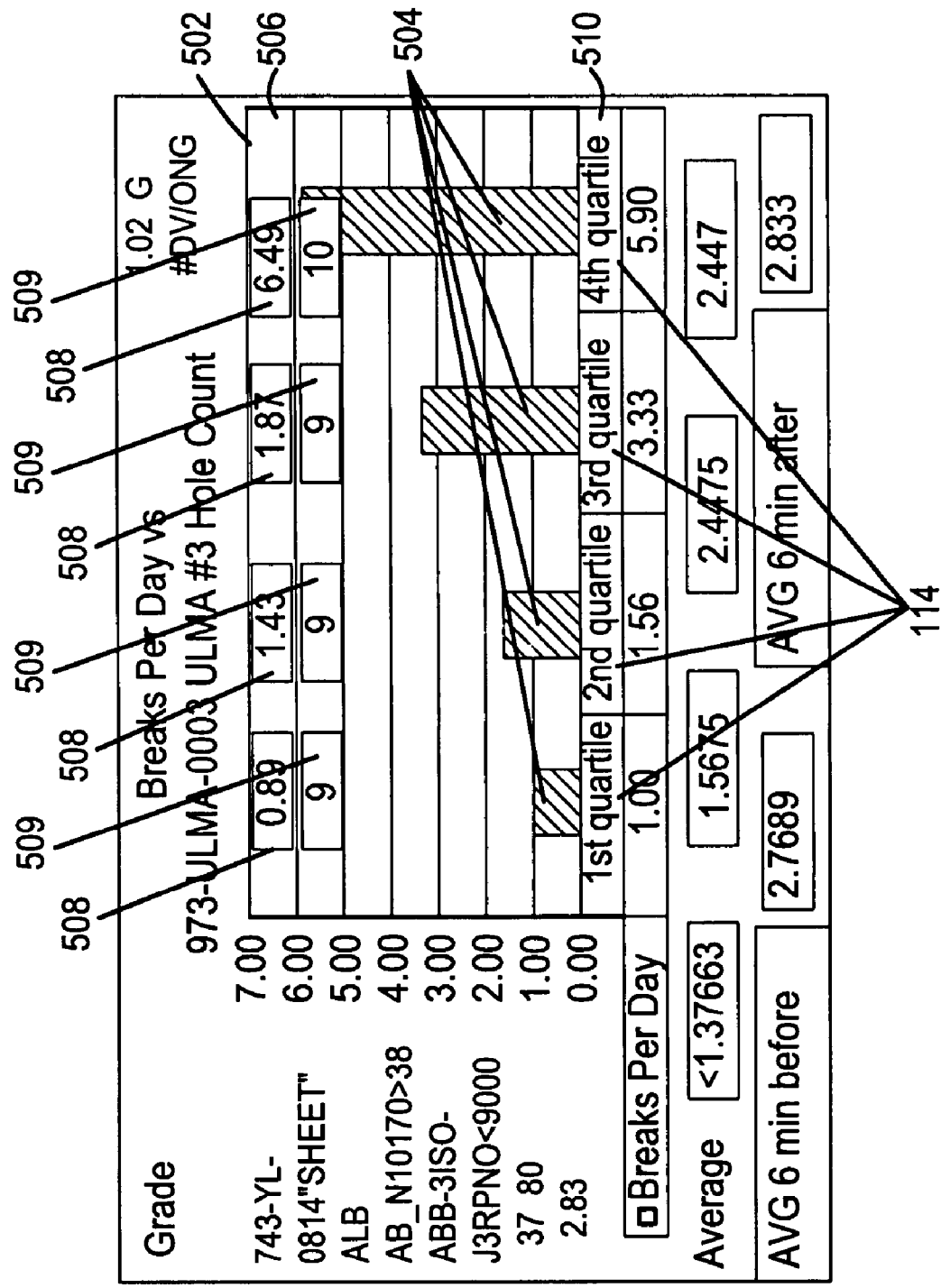
FIG. 5 is a screen shot illustrating a quartile distribution of an independent variable and its mapping to dependent variable data.

A graph is generated to visually associate the independent variable 108 and the dependent variable 106 average values. Referring to FIG. 5, a display image 500 is shown including a bar graph 502. The bar graph 502 includes a vertical bar 504 for each of the distribution sets 114, the vertical extent of each bar 504 indicating the average value for the dependent variable 106 within the associated distribution set 114. Along the top of the bar graph 502, an independent variable legend 506 displays the independent variable average value 508 for each of the distribution sets 114. A bin count legend 509 displays the number of bins 102 within each of the distribution sets 114. Note that a graph may be derived from either the average value or the coefficient of variation of the independent variable within each bin 102.

If additional independent variables 108 were identified, the next independent variable is selected (step 234) and the process repeated from step 222.

The bar graph 502 depicted in FIG. 5 shows a number of breaks per day in a paper manufacturing process verses a hole count, wherein breaks per day refers to breaks in the paper product web, while the hole count is a count of holes in the paper product web at a particular point in the paper manufacturing process. It can be recognized, by inspection of the bar graph 502, that there is a correlation between the breaks per day and the hole count. A fourth quartile 510 distribution set 114, which contains the highest independent variable values, also indicates the highest number of breaks per day.

Figure 6:
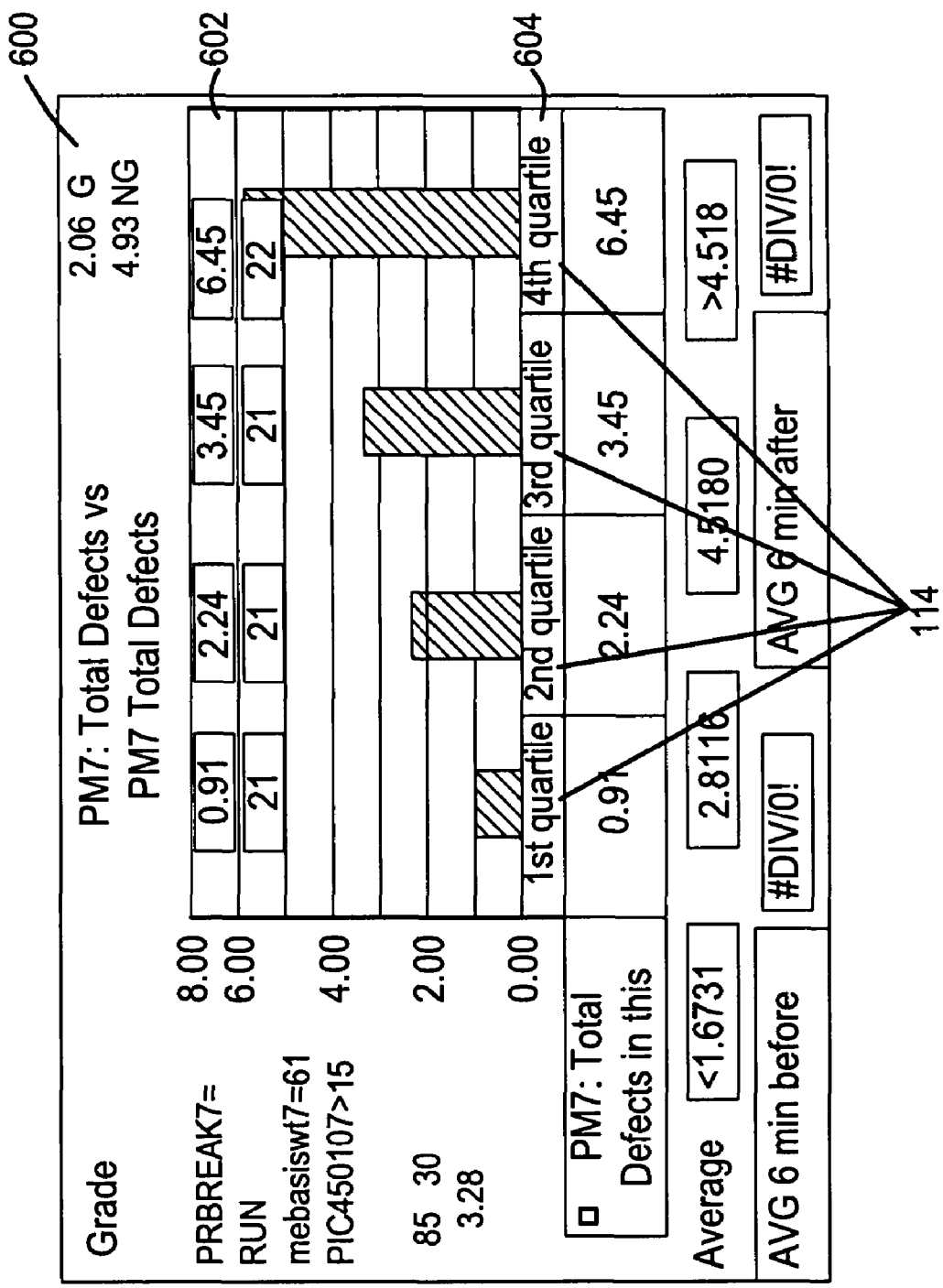
FIG. 6 is a screen shot illustrating the comparison of a dependent variable to itself to obtain a quartile distribution of the dependent variable.

Turning now to FIG. 6, a special case is illustrated wherein the same variable is selected as both the dependent variable 106 and the independent variable 108. The resulting display image 600 includes a bar graph 602 that depicts a distribution of the dependent variable across the quartile distribution sets 114. The bar graph 602 depicted in FIG. 6 ranks the variable "Total Defects" into quartile distribution sets 114. It is worth noting that this distribution identifies the "worst case" 604 among the distribution sets 114 for the dependent variable 106. Thus, it is useful to know that no other independent variable 108 can have a single distribution set 114 with a greater dependent variable 106 average value, unless the distribution set 114 based on a different independent variable 108 contains fewer bins 102.

It can be recognized that, once distribution sets 114 are determined for a given independent variable 108 and a given set of defined constraints, the distribution sets 114 and their associated average and coefficient of variation values for the independent variable do not change for subsequent analyzes utilizing different dependant variables 106, except for generally trivial changes that may result if, for example, pairings of independent variable 108 and dependent variable 106 samples result in slightly different distribution set 114 breakpoints. This allows for the comparison of multiple graphs, based on several dependent variables 106 each graphed against the same independent variable 108 distribution sets 114, to reveal causal relationships among the variables rather than a mere correlation.

Figure 7:
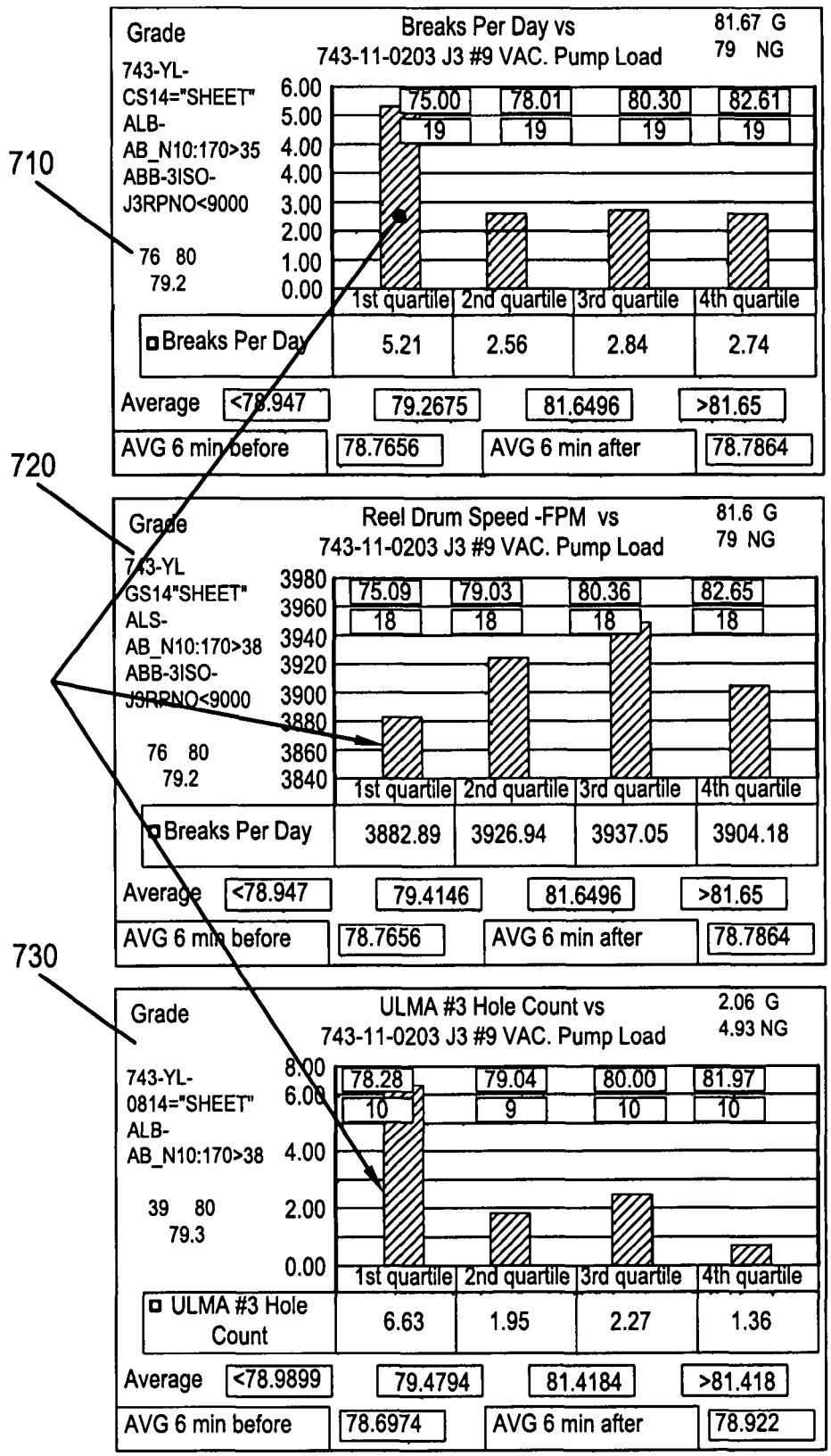
FIG. 7 illustrates the graphical relationship between multiple analyses showing a correlation between a dependent variable and at least one independent variable.

Turning to FIG. 7, it is shown that the computerized method for data analysis provides great insight into cause and effect relationships when multiple graphs are produced to discover relationships between multiple dependent variable 106 and independent variable 108 parings. In the example illustrated in FIG. 7, a paper manufacturing process for producing a manufactured paper web is analyzed to determine a cause of excessive paper breaks within the process in a day. Data collected from the paper manufacturing process includes the number of paper breaks per day, a measured vacuum pump load, a reel drum speed, and a count of holes found in the manufactured paper web (hole count). In each of three analyses, the measured vacuum pump load ("#9 VAC. PUMP LOAD") is used as the independent variable 108. In a first analysis, wherein the computerized method for data analysis results in graph 710, the number of paper breaks per day ("Breaks Per Day") is chosen as the dependent variable 106. The resulting graph 710 reveals that the breaks per day are correlated with a low vacuum pump load.

Additionally, in a second analysis, wherein the computerized method for data analysis results in graph 720, the reel drum speed ("Reel Drum Speed-FPM") is chosen as the dependent variable 106. The resulting graph 720 reveals that the real drum speed is also correlated with a low vacuum pump load. Finally, in a third analysis, wherein the computerized method for data analysis results in bar graph 730, the hole count ("#3 Hole Count") is chosen as the dependent variable 106. The resulting bar graph 730 reveals that the hole count too is correlated with a low vacuum pump load.

It follows that, while a comparison of breaks per day against reel drum speed and against hole count may indicate a correlation, the presentation of multiple analyses, effectively holding constant the independent variable across each analyses, reveals with a significant degree of confidence an actual causation of the paper breaks. More particularly, in this example, one proceeds to calculate the speed for the low vacuum pump load because paper breaks might have been caused by high speed; "freezing" the quartiles tells those skilled in the art that, in fact, the speed was the lowest in this quartile. Thus, high speed is not causing the breaks.

This method of "freezing the quartiles" also effectively identifies how human and control policies corrupt historical data. For example, if slow speed is associated with high break counts, it could be due to operators slowing down when they have problems. The fact that "slowing down" does not "fix" the problem tells one that taking action is not a "lever" with which to control breaks.

Thus, it can be seen that the computerized method for data analysis results in a graphical presentation of data gathered from a manufacturing process to reveal a causation of a fault condition, or a quality measure, production rate, speed, etc., within the manufacturing process.

Other implementations of methods of data analysis may include graphs that focus on displaying only an independent variable or a dependent variable plotted against itself (like the implementation illustrated in FIG. 6). Other graph types and styles may be used other than bar graphs, however, including, by non-limiting example, bar plots, quartile plots, slider plots, groups of sequential indicators, and any other plot or graph capable of indicating the position of a variable on a single-variable axis or dimension.

Figure 8:
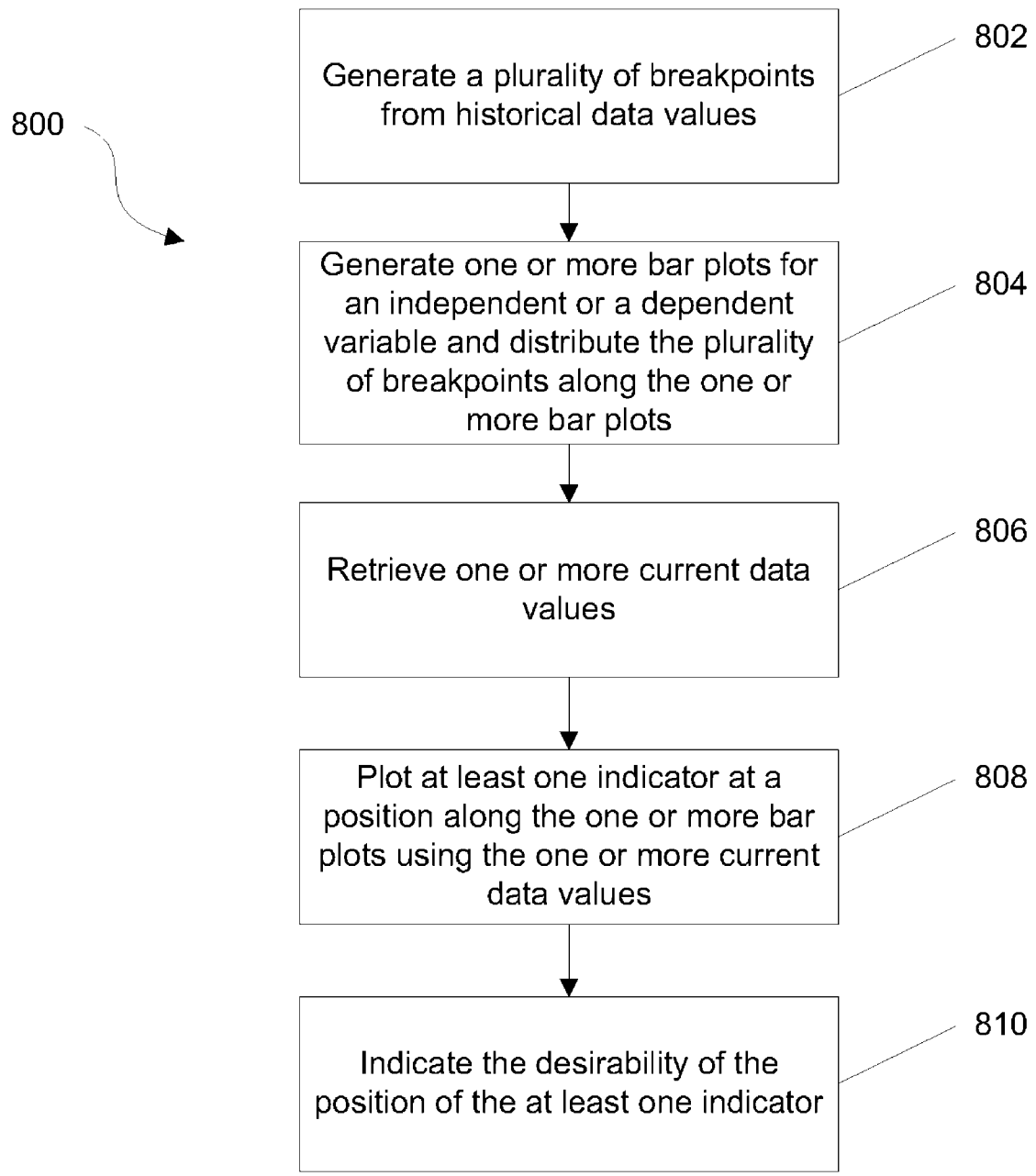
FIG. 8 is an illustration of an implementation of a method of generating one or more bar plots.

Referring to FIG. 8, an implementation of a method of constructing a bar plot 800 is illustrated. As illustrated, the method may include generating a plurality of breakpoints from historical data values (step 802) and generating one or more bar plots for an independent or a dependent variable and distributing the plurality of breakpoints along the one or more bar plots (step 804). In particular implementations, the breakpoints may be quartile values, and based upon the quartile value sizes, the dimensions of the bar plot may be constructed and the breakpoints distributed along a long dimension of the bar plot. Because a bar plot is a plot of a single variable against itself, a bar plot is a single variable plot with a single axis. Accordingly, distributing values along the plot can be considered equivalent to plotting the points along the single axis of the plot.

The method may further include retrieving one or more current data values (step 806) and plotting at least one indicator at a position along the one or more bar plots using the one or more current data values (step 808). The current data values may be values of the independent or dependent variable that are instantaneously obtained, or may be the latest value or values calculated during the latest run of a data extraction and analysis tool used to generate the values. The method may also include indicating the desirability of the position of the at least one indicator. To indicate desirability, the shape of the indicator may be changed from one shape type to another, the shape color or the color of an area around the shape may be altered, or the shape or an area around the shape may become or stop being animated.

Desirability depends upon the nature of the independent or dependent variable being analyzed. Certain variables, such as fuel consumption rates, for example, are usually most desirable when at the lowest level possible. The current value of a fuel consumption rate plotted on the bar plot as an indicator will show the relationship between the current value and the historical values of fuel consumption rates. If quartile values are used for the breakpoints on the bar plot, the color of the indicator could change from green to red as it moves across the bar plot from the lowest historical quartile to the highest historical quartile, or from the lowest rate to the highest, for example. Depending upon the nature of the independent or dependent variable, however, the optimal position may be in the center, at either end, or in multiple quartiles of the bar plot.

In implementations of the method 800 and in the other methods subsequently discussed, the methods may be performed either manually or automatically. For example, in manual implementations, the historical data values may be collected by hand or from written log sheets and the bar plots graphed by hand either completely or the indicators drawn on bar plot templates. In automatic implementations, the historical data values may be collected from electronic sensors and equipment used in an industrial or other process and stored in computer readable form on computer readable media in one or more databases that are part of a computer or computer system. Automatic implementations may be implemented using a computer, software incorporated in computer readable media, or with a computer and software. The bar plots may be generated and displayed on computer terminals in various arrangements depending upon the resolution, color, and software programs available.

Figure 9:
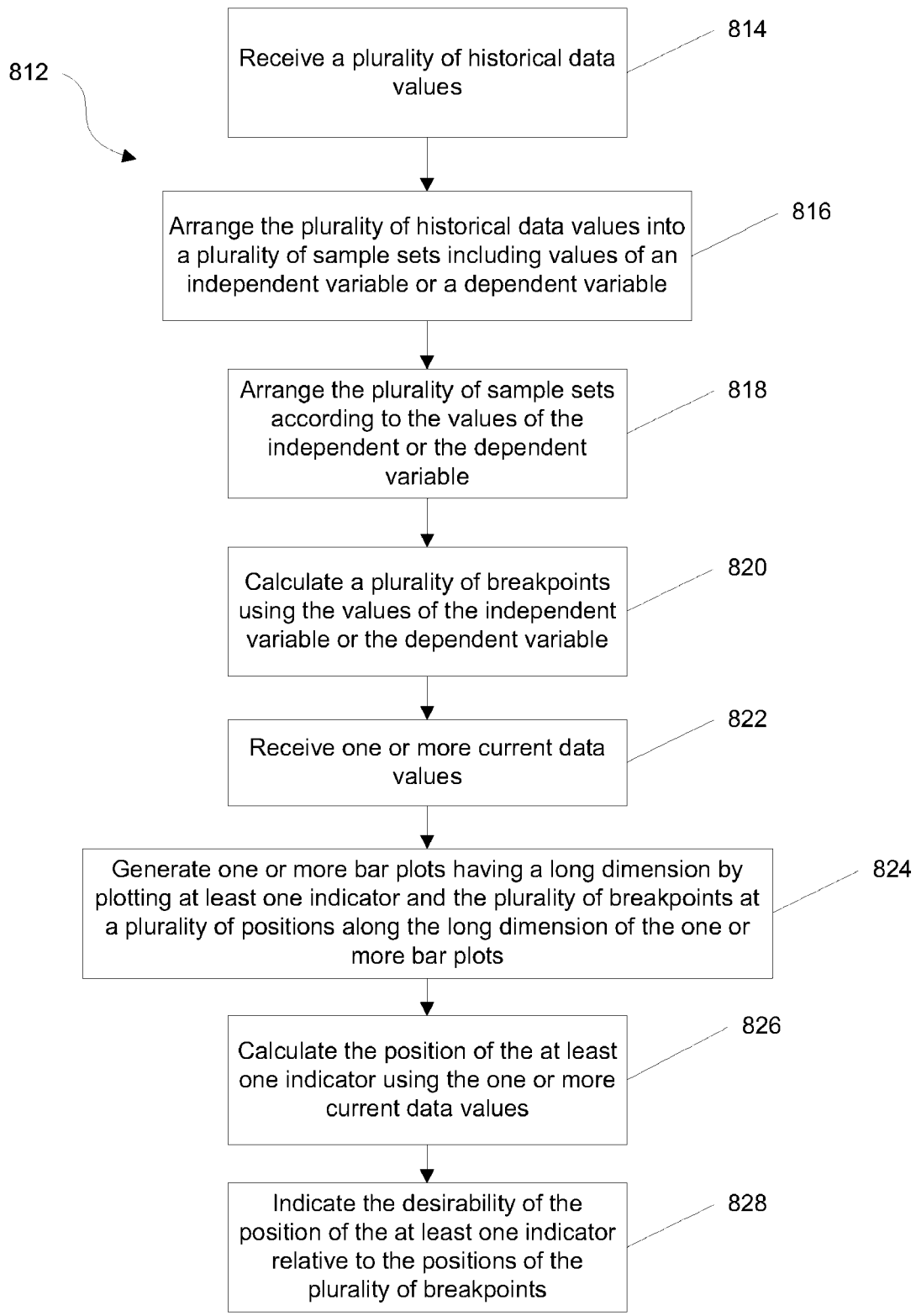
FIG. 9 is an illustration of another implementation of a method of generating one or more bar plots.

Referring to FIG. 9, another implementation of a method of constructing a bar plot 812 is illustrated. As illustrated, the method 812 may include receiving a plurality of historical data values (step 814) and arranging the plurality of historical data values into a plurality of sample sets including values of an independent or a dependent variable (step 816). The method may further include arranging the plurality of sample sets according to the values of the independent or the dependent variable (step 818) and calculating a plurality of breakpoints using the values of the independent variable or the dependent variable (step 820). The plurality of breakpoints may be quartiles in particular implementations. The method may also include receiving one or more current data values from a process (step 822), such as an industrial process, and generating one or more bar plots having a long dimension by plotting at least one indicator and the plurality of breakpoints at a plurality of positions along the long dimension of the one or more bar plots (step 824). Calculating the position of the at least one indicator using the one or more current data values (step 826) and indicating the desirability of the position of the at least one indicator relative to the positions of the plurality of breakpoints may also be included in implementations of the method (step 828).

Figure 10:
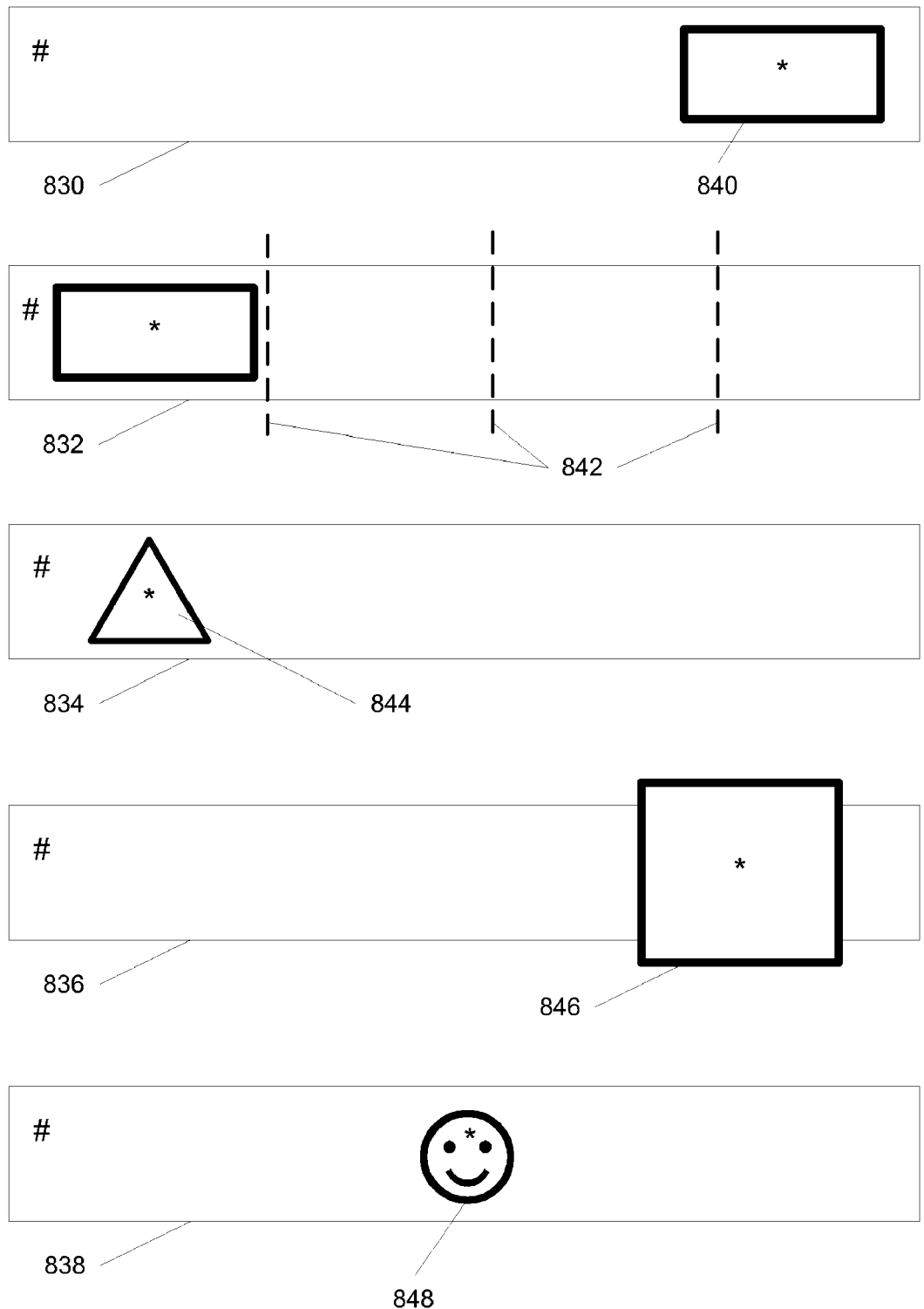
FIG. 10 illustrates various implementations of bar plots and indicators.

Implementations of methods of constructing bar plots 800, 812 may be utilized to construct any of a wide variety of bar plots and other single variable plots. Examples provided herein are for the exemplary purposes of this disclosure and many other types are possible utilizing the principles disclosed in this document. Referring to FIG. 10, several implementations of bar plots 830, 832, 834, 836, and 838 are illustrated. Bar plot 830 has a rectangular indicator 840 with a dark border. The dark border of the rectangular indicator 840 can be a particular color, such as green, and change as the rectangular indicator 840 moves across the bar plot 830. In other implementations, the area around the rectangular indicator 840 may change color as the indicator 840 moves across the bar plot 830 in response to changes in the current value of the independent or dependent variable the indicator 840 represents.

Bar plot 832 includes three quartile breakpoint indicators 842 shown in dotted lines. These quartile breakpoint indicators 842 may be shown on implementations of bar plots to allow viewers to see the location of the indicator relative to a particular quartile. Numerical labels indicating the value of the independent or dependent variable at the particular quartile may also be included in particular implementations.

Bar plot 834 includes an indicator 844 that has changed its shape from a rectangle to a triangle as the indicator 844 has moved across the bar plot. The shape of the indicator may be chosen to convey a message to the viewer; in this implementation, the triangular shape of the indicator 844 may indicate a warning, telling the viewer that action is required. Any of the many standard warning shapes or other arbitrary shapes could be chosen for indicators, both those that change depending upon quartile position, and generally, such as, by non-limiting example, octagons, squares, parallelograms, ellipsoids, and any other closed shape.

Bar plot 836 includes an indicator 846 that has changed size as the indicator 846 has moved across the bar plot from a rectangle inside the vertical dimension of the plot to one that exceeds that dimension. Such an indicator 846 could also change color, and also could be animated depending upon its position along the plot. For example, the shape could flash, its outline could blink, or an icon could flash on top of the shape (like an exclamation point or other warning symbol, for example). Any of a wide variety of animations and size changes are possible.

Bar plot 838 illustrates an indicator 848 that is an icon that has changed appearance or type depending upon the position of the indicator 848 along the bar plot. In this case, the location of the indicator demonstrates that the current values of the independent or dependent variable are in a desirable location based on historical quartile data and the indicator 848 visually indicates that desirability. If the indicator 848 were to move to a less desirable location, the icon used for the indicator 848 could change to one showing alarm or another warning or other shape could replace the icon.

Figure 11:
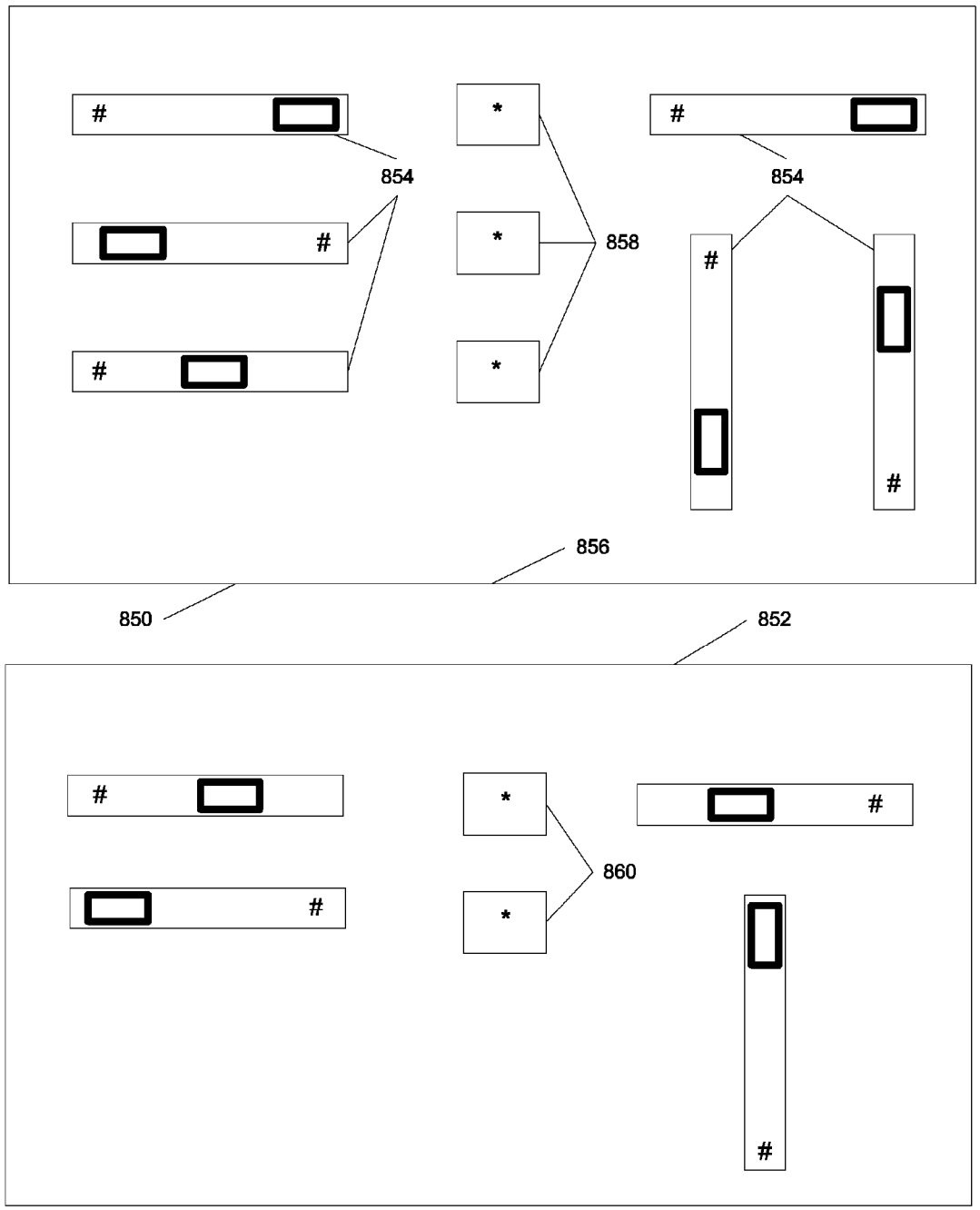
FIG. 11 illustrates an implementation of a first screen and an implementation of an additional screen.

Referring to FIG. 11, implementations of screens 850, 852 are illustrated. Screen 850 includes a plurality of bar plots 854 that are oriented either horizontally or vertically relative to a bottom side of the screen 856. The vertically oriented bar plots 854 may be particularly useful for visually indicating the level of fluids in tanks or other vessels or the level of a charge in a battery, for example. Screen 850 may be a first screen and contain primarily plots of dependent variables. Screen 852 may be an additional screen showing primarily plots of independent variables, and may be one of a plurality of additional screens. The bar plots on screen 852 may be plots of independent variables that directly influence the values of a particular dependent variable or variables plotted on screen 850, the first screen. By viewing the bar plots on screen 852 of the independent variables, a user may be able to determine a probable reasons for why an indicator on a bar plot of a dependent variable displayed on screen 850, the first screen is at a particular position.

For example, a bar plot on screen 850 may represent the dependent variable fuel gas rate, and the indicator on the bar plot may show that the current value of the rate is elevated to the fourth quartile. To investigate the potential cause for the elevated consumption of fuel gas, a user may view one or more additional screens like screen 852 that may include bar plots of independent variables that are known to affect the fuel gas rate. One of these bar plots may be of the sulfur content in crude oil being processed by a particular refinery process, and the indicator on that bar play may show that the sulfur content is also elevated to the fourth quartile. Because both variables are elevated, the user may be able to conclude that the cause of elevated fuel gas consumption is the high level of sulfur in the crude oil being processed at this point in the process. The use of the screens 850, 852 may also assist a user with discovering sensor and/or other equipment or process issues. In the previous example, if the fuel gas rate bar plot was in the fourth quartile, but on an additional screen a bar plot of the independent variable fuel gas flow valve position indicated that the valve position was only in the first quartile, a user might conclude that either the valve or the position sensor was in need of adjustment or repair.

The one or more additional screens like screen 852 may be accessed either by selecting one of the bar plots 854 on the first screen 850 or by selecting one or more indicators 858, such as, by non-limiting example, a button, a hyperlink, a radio control, or any other element useful in a computer program for transferring from one view to another. As illustrated, one or more indicators 860 that allow access to one or more additional screens may also be included on the one or more additional screens accessible from the first screen 850. These indicators may allow further "drilling down" access to additional bar plots of independent and/or dependent variables helpful for understanding the relationships between a particular bar plot or group of bar plots.

Figure 12:
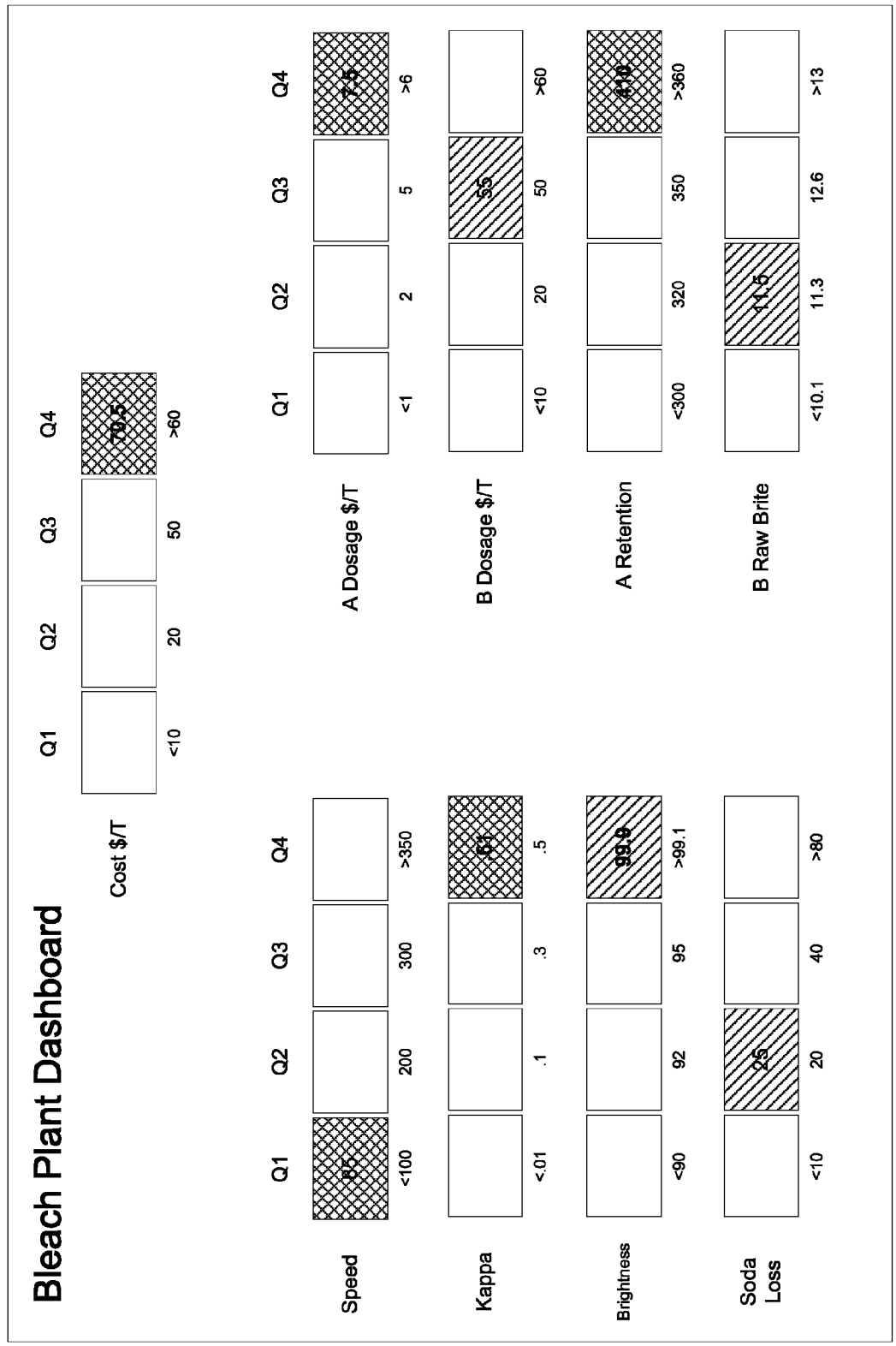
FIG. 12 illustrates an implementation of a first screen used for a bleaching plant.

Referring to FIG. 12, an implementation of a first screen for a paper bleaching plant is illustrated. As illustrated, the first screen may include a plurality of bar plots, each representing a dependent or independent variable, such as a cost (dollars per ton, $/T), a material output parameter (Brightness), or a process parameter (A Retention). Also as illustrated, the bar plots may include quartile indicators and numerical labels that allow the viewer to see exactly in which quartile the particular variable is in (as shown by the indicator on the plot) and what historical quartile statistic (such as an average value) is associated with that particular quartile. The desirability of the position of the indicator may be indicated by color, red being undesirable (represented by the cross-hatched indicators) and green being desirable (represented by the single hatched indicators). One or more additional screens including various independent or dependent variables could also be included along with various indicators allowing a user to "drill down" or open the one or more additional screens.

It will be understood that implementations are not limited to the specific components disclosed herein, as virtually any components consistent with the intended operation of a method and/or system implementation for a data analysis system may be utilized. Accordingly, for example, although particular computers, servers, routers, keyboards, mice, network interfaces, screens, bar plots, and network components may be disclosed, such components may comprise any shape, size, style, type, model, version, class, grade, measurement, concentration, material, weight, quantity, and/or the like consistent with the intended operation of a method and/or system implementation for a data analysis system may be used.

In places where the description above refers to particular implementations of data analysis systems and related methods, it should be readily apparent that a number of modifications may be made without departing from the spirit thereof and that these implementations may be applied to other data analysis systems and other related methods. All changes that come within the meaning of and range of equivalency of the claims are intended to be embraced therein.

The invention claimed is:

1. A method of generating one or more bar plots for evaluating the performance of a process, the method comprising:
   generating, by a computer, a plurality of breakpoints using historical data values from a process;
   generating, by the computer, one or more bar plots for an independent or a dependent variable and distributing the plurality of breakpoints along the one or more bar plots;

retrieving, by the computer, one or more current data values from the process;

plotting, by the computer, at least one indicator at a position along the one or more bar plots using the one or more current data values; and indicating, by the computer, the desirability of the position of the at least one indicator relative to the plurality of breakpoints.

2. The method of claim 1, wherein generating one or more bar plots further comprises generating one or more bar plots corresponding with one or more dependent variables on a first screen and generating one or more bar plots corresponding with one or more independent variables on one or more additional screens.

3. The method of claim 2, further comprising accessing the one or more bar plots comprised on one or more additional screens by selecting one or more of the one or more bar plots on the first screen or by selecting one or more indicators on the first screen configured to access the one or more bar plots comprised on the one or more additional screens.

4. The method of claim 1, wherein using the one or more current data values further comprises calculating an average or coefficient of variation using the one or more current data values.

5. The method of claim 1, wherein the plurality of breakpoints are quartiles.

6. The method of claim 1, wherein indicating the desirability of the position of the at least one indicator relative to the plurality of breakpoints further comprises changing one of a color, a size, an icon, an animation, and a shape of the at least one indicator.

7. The method of claim 1, wherein the one or more bar plots further comprise a long dimension and wherein generating the one or more bar plots further comprises orienting the long dimension vertically or horizontally.

8. The method of claim 1, wherein the historical data values and the current data values are comprised in computer readable form on computer readable media in one or more databases comprised in a computer system coupled with the process.

9. A method of generating one or more bar plots for evaluating the performance of a process, the method comprising:

receiving, by a computer, a plurality of historical data values;

arranging, by the computer, the plurality of historical data values into a plurality of sample sets, the plurality of sample sets comprising values of an independent variable or a dependent variable;

arranging, by the computer, the plurality of sample sets according to the values of the independent variable or the dependent variable;

calculating, by the computer, a plurality of breakpoints using the values of the independent variable or the dependent variable;

receiving, by the computer, one or more current data values comprising values of the independent variable or the dependent variable;

generating, by the computer, one or more bar plots having a long dimension by plotting at least one indicator and the plurality of breakpoints at a plurality of positions corresponding with values of the independent or the dependent variable along the long dimension of the one or more bar plots, the position of the at least one indicator calculated using the one or more current data values; and indicating, by the computer, the desirability of the position of the at least one indicator relative to the positions of the plurality of breakpoints by changing one of a color, a size, an icon, an animation, and a shape of the at least one indicator.

10. The method of claim 9, wherein generating one or more bar plots further comprises generating one or more bar plots corresponding with one or more dependent variables on a first screen and generating one or more bar plots corresponding with one or more independent variables on one or more additional screens.

11. The method of claim 10, further comprising accessing the one or more bar plots comprised on one or more additional screens by selecting one or more of the one or more bar plots on the first screen or by selecting one or more indicators on the first screen configured to access the one or more bar plots comprised on the one or more additional screens.

12. The method of claim 9, wherein the plurality of breakpoints are quartiles.

13. The method of claim 9, wherein the historical data values and the current data values are comprised in computer readable form on computer readable media in one or more databases comprised in a computer system coupled with the process.

* * * * *